US007218945B2

(12) United States Patent
Ogami

(10) Patent No.: US 7,218,945 B2
(45) Date of Patent: May 15, 2007

(54) TRANSMISSION POWER CONTROLLING METHOD AND BASE STATION APPARATUS

(75) Inventor: Tadashi Ogami, Tokyo (JP)

(73) Assignee: NEC Corporation, Tokyo (JP)

( * ) Notice: Subject to any disclaimer, the term of this patent is extended or adjusted under 35 U.S.C. 154(b) by 482 days.

(21) Appl. No.: 10/321,657

(22) Filed: Dec. 18, 2002

(65) Prior Publication Data

US 2003/0119542 A1    Jun. 26, 2003

(30) Foreign Application Priority Data

Dec. 20, 2001   (JP) .............................. 2001-388370

(51) Int. Cl.
*H04B 7/00*    (2006.01)
(52) U.S. Cl. ..................... 455/522; 370/318
(58) Field of Classification Search ............... 455/522, 455/69, 500, 67.1, 435.3, 512; 370/335, 370/329, 342, 311, 235, 232, 318
See application file for complete search history.

(56) References Cited

U.S. PATENT DOCUMENTS

| 6,226,281 B1 | 5/2001 | Cordier et al. |
| 6,694,148 B1* | 2/2004 | Frodigh et al. ............. 455/522 |
| 2003/0125040 A1* | 7/2003 | Walton et al. ............. 455/454 |

FOREIGN PATENT DOCUMENTS

| EP | 0 565 505 A2 | 10/1993 |
| JP | H9-36801 | 2/1997 |
| JP | 2001-217812 | 8/2001 |
| JP | 2001-345755 | 12/2001 |
| JP | 2002-077040 | 3/2002 |
| WO | WO 01-39540 A1 * | 5/2001 |
| WO | WO 01/39540 A1 | 5/2001 |

OTHER PUBLICATIONS

Alejandro de Hoz "W-CDMA Downlink Performance Analysis" pp. 968, 969 Apr. 1999.*
European Office Action dated Oct. 16, 2003.
Alejandro de Hoz, et al., "W-CDMA Downlink Performance Analysis", Vehicular Technology Conference, 1999. Vtc 1999, pp. 968-972.

(Continued)

*Primary Examiner*—Edward F. Urban
*Assistant Examiner*—Tu X. Nguyen
(74) *Attorney, Agent, or Firm*—McGinn IP Law Group, PLLC

(57) ABSTRACT

A transmission power controlling method and a base station apparatus capable of limiting total downlink transmission power while keeping adverse effects on common channels to a minimum. There is provided the transmission power controlling method for limiting total downlink transmission power for transmission from the base station to subject user terminals to less than or equal to a specified maximum value of total downlink transmission power in a mobile communication wireless network in which a plurality of wireless base stations execute adaptive transmission-power control by setting TPC bits in a wireless line in which user terminals have multiple access, wherein, when the value of the total downlink transmission power approximates to the maximum value, a base station apparatus restrains an increase in transmission power of a dedicated line to a user terminal, which is required to be increased at a next time slot.

12 Claims, 4 Drawing Sheets

OTHER PUBLICATIONS

European Search Report dated Apr. 10, 2003.
Alejandro de Hoz, et al., "W-CDMA Downlink Performance Analysis", Vehicular Technology Conference, Sep. 19, 1999, pp. 968-972.

Japanese Office Action dated May 30, 2006 (with partial English translation).

* cited by examiner

TRANSMISSION POWER CONTROLLING METHOD AND BASE STATION APPARATUS

BACKGROUND OF THE INVENTION

The present invention relates to a transmission power controlling method and a base station apparatus for controlling total downlink transmission power in a mobile communication wireless network.

DESCRIPTION OF THE RELATED ART

Heretofore, there has been known a technique for limiting total downlink transmission power for transmission from a base station to less than or equal to specified maximum total downlink transmission power in a mobile communication wireless network.

In the following, an explanation is given of a conventional transmission power controlling method and a base station apparatus in reference to a drawing.

FIG. 1 is a block diagram showing a configuration of the base station apparatus to explain the transmission power controlling method in the prior art.

As shown in FIG. 1, there are a plurality of transmitter circuits 41 for dedicated CHs (CHannels) to respective users and a plurality of transmitter circuits 42 for control CHs such as CPICH (Common PIlot CHannel), PCCPCH (Primary Common Control Physical CHannel) and the like in the base station apparatus. Signals output from the respective transmitter circuits are added up to one signal. The total transmission power of this signal is cut at a transmission power limiting circuit 43 so as to be less than or equal to a maximum value of total downlink transmission power, which is specified by RNC (Radio Network Controller). The resultant signal is output to a RF (Radio Frequency) circuit 44.

In the conventional transmission power controlling method and base station apparatus, however, there has been a problem as below.

In the prior art, when the total downlink transmission power used for transmission from the base station apparatus exceeds a maximum value of total downlink transmission power specified by the RNC with respect to each cell, the excess power over the specified value is forcibly cut without weighting depending on contents of transmitted data. This adversely affects such a system in which all CHs are code-multiplexed as the W-CDMA system because the power of the respective common CHs such as the PCCPCH and CPICH, which are commonly used by all user terminals in the same cell, is also nonlinearly cut.

SUMMARY OF THE INVENTION

It is therefore an object of the present invention to provide a transmission power controlling method and a base station apparatus capable of limiting total downlink transmission power while keeping adverse effect on common channels to a minimum.

According to a first aspect of the present invention, for achieving the object mentioned above, there is provided a transmission power controlling method for limiting total downlink transmission power for transmission from a base station to subject user terminals to less than or equal to a specified maximum value of total downlink transmission power in a mobile communication wireless network in which a plurality of wireless base stations execute adaptive transmission-power control by setting transmit power control bits in a wireless line having multiple-access to user terminals, wherein, when the value of the total downlink transmission power approximates to the maximum value, a base station apparatus restrains an increase in transmission power of a dedicated line to a user terminal, which is required to be increased at a next time slot.

By this means, the transmission power in the dedicated lines is preferentially limited, and adverse effects on the common lines can be reduced when limiting the total downlink transmission power to less than or equal to the maximum value of total downlink transmission power.

According to a second aspect of the present invention, in the first aspect, a threshold value that is less than the maximum value of total downlink transmission power is set to restrain an increase in transmission power of a dedicated line to a user terminal, which is required to be increased at a next time slot, when total downlink transmission power exceeds the threshold value.

By the setting of the threshold value that is less than the maximum value of total downlink transmission power, it becomes possible to use the threshold value as a trigger for restraining an increase in transmission power of dedicated lines.

According to a third aspect of the present invention, in the first or second aspect, an increase in transmission power of a dedicated line to a user terminal, which is required to be increased at a next time slot, is restrained according to a given decreasing function in which a value of total downlink transmission power that is normalized on the basis of the maximum value of total downlink transmission power falls in a domain thereof and a value of an increase in the transmission power of the dedicated line falls in a range thereof.

By this means, it becomes possible to more precisely control the transmission power to avoid adverse effects on the common lines efficiently and effectively.

According to a fourth aspect of the present invention, in any one of the first to third aspects, the wireless network is based on the wideband-code division multiple access (W-CDMA) system.

When the present invention is implemented in the wireless network based on the W-CDMA system, the desired actions can be obtained.

According to a fifth aspect of the present invention, there is provided a base station apparatus for a mobile communication wireless network, comprising:

a plurality of transmitter circuits for respective user terminals;

a plurality of transmitter circuits for common lines;

a transmission power limiting circuit; and a radio frequency circuit, wherein:

output signals from the transmitter circuits for respective user terminals and for common lines are added up to one output signal;

total downlink transmission power of the added-up output signal is cut at the transmission power limiting circuit so as to be less than or equal to a specified maximum value of total downlink transmission power;

the resultant signal is output to the radio frequency circuit;

a value of the total downlink transmission power of the added-up signal is notified in each time slot from the transmission power limiting circuit to the respective transmitter circuits for respective user terminals; and a value of downlink transmission power is set at the respective transmitter circuits for respective user terminals in accordance with a received transmit power control bit and the notified value of the total downlink transmission power.

As described above, the value of the total downlink transmission power of the added-up signal is fed back from the transmission power limiting circuit to the respective transmitter circuits for respective user terminals. Accordingly, it becomes possible to control the downlink transmission power on the basis of the feedback.

According to a sixth aspect of the present invention, in the fifth aspect, when the value of the total downlink transmission power approximates to the maximum value, a transmitter circuit for a user terminal, which is requested to increase its transmission power at a next time slot by the received transmit power control bit, restrains an increase in the transmission power and sets a value of downlink transmission power.

By this means, the transmission power of the dedicated lines is preferentially limited, and it becomes possible to reduce adverse effects on the common lines when limiting the total downlink transmission power to less than or equal to the maximum value of total downlink transmission power.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
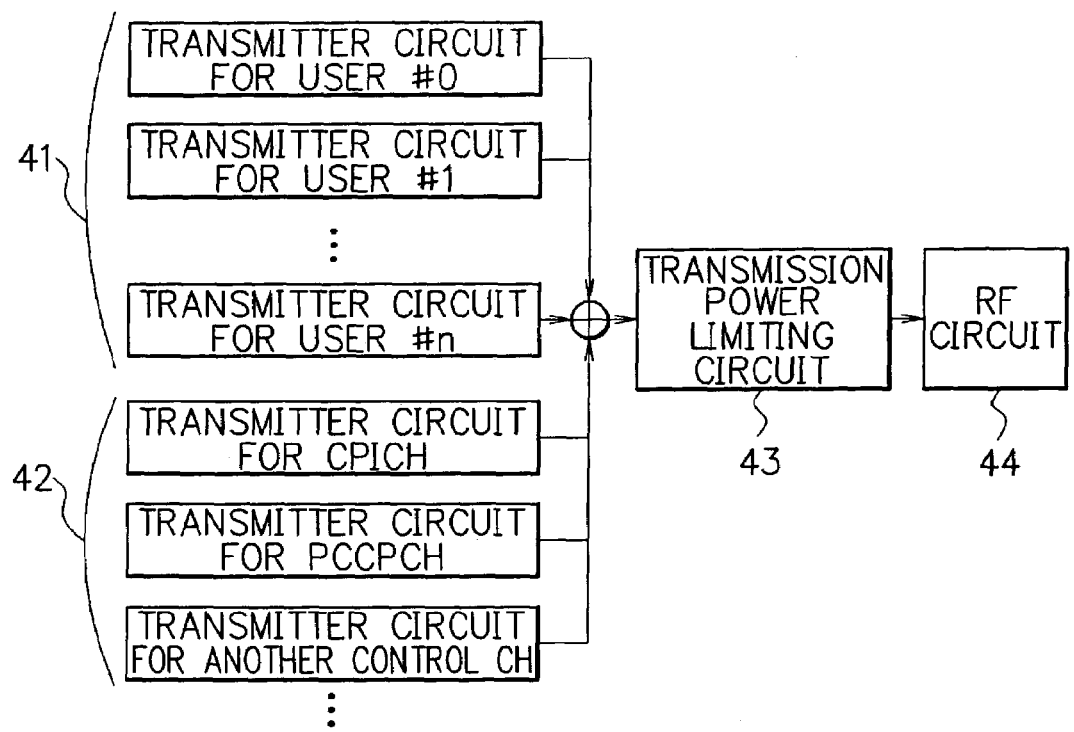
FIG. 1 is a schematic block diagram showing a configuration of a transmitting section in a conventional base station apparatus for explaining a prior transmission power controlling method.

Referring now to the drawings, an explanation is given of a transmission power controlling method and a base station apparatus according to one embodiment of the present invention.

Figure 2:
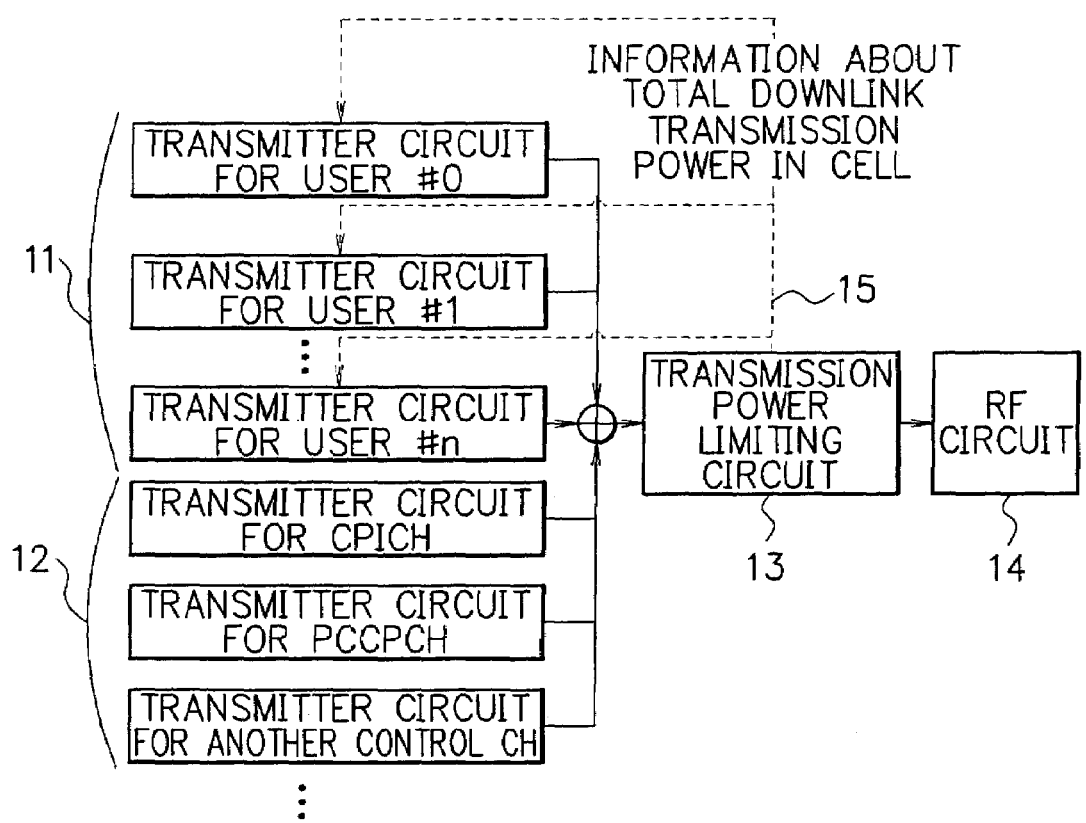
FIG. 2 is a schematic block diagram showing a configuration of a transmitting section in a base station apparatus for explaining a transmitting transmission power controlling method according to one embodiment of the present invention.

FIG. 2 is a schematic block diagram showing a configuration of a transmitting section in the base station apparatus for explaining the transmission power controlling method according to the embodiment of the present invention.

As depicted in FIG. 2, the transmitting section of the base station apparatus comprises a plurality of transmitter circuits 11 for respective users and a plurality of transmitter circuits 12 for control CHs such as CPICH and PCCPCH and the other control CHs. The other control channels include SCCPCH (Secondary Common Control Physical CHannel) and the like. Signals output from the respective transmitter circuits are added up to one signal. The total transmission power of this signal is cut at a transmission power limiting circuit 13 so as to be less than or equal to a maximum value of total downlink transmission power, which is specified by RNC. The resultant signal is output to a RF circuit 14.

The transmission power limiting circuit 13 notifies the transmitter circuits 11 for respective users of the value of the total downlink transmission power in each TS (Time Slot) as represented by the dotted line 15 shown in FIG. 2. Each of the transmitter circuits 11 reduces or increases its downlink transmission power to set the value of the downlink transmission power according to an uplink TPC (Transmit Power Control) bit and the notified value of the total downlink transmission power and/or a result obtained by comparing the notified value of the total downlink transmission power with a threshold value.

In the following, an explanation is given of an operation of the base station apparatus and the transmission power controlling method according to the embodiment of the present invention referring to the drawings.

Figure 3:
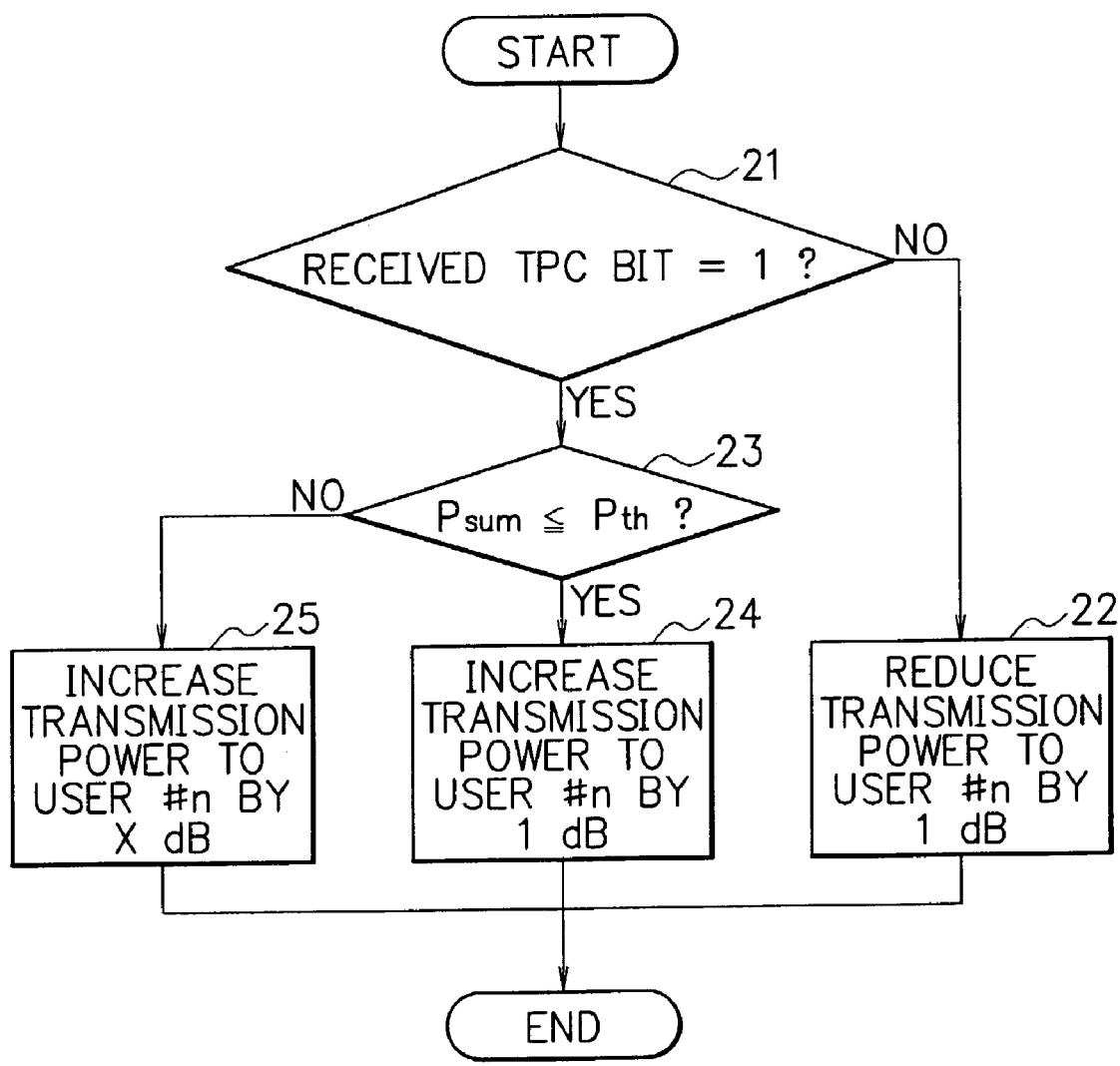
FIG. 3 is a flowchart for explaining an operation of the base station apparatus and the transmission power controlling method when determining a value of transmission power to each user according to the embodiment.
Figure 4:
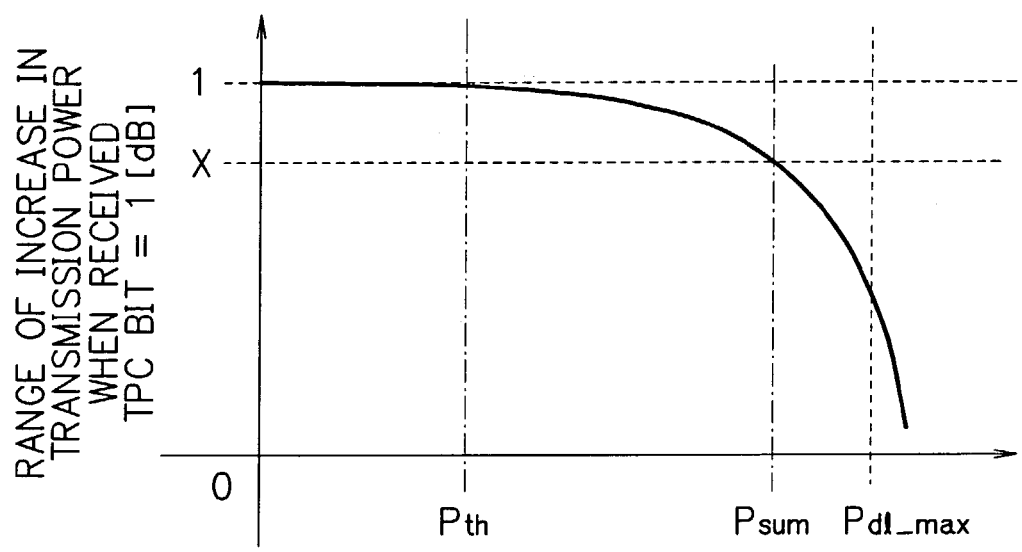
FIG. 4 is a graph showing a state of transmission power control in a dedicated CH by the transmission power controlling method in the base station apparatus according to the embodiment.

FIG. 3 is a flowchart for explaining an operation of the base station apparatus adopting the transmission power controlling method when determining a value of transmission power to each user. FIG. 4 is a graph showing a state of transmission power control in a dedicated CH (line), wherein the horizontal axis indicates a value of total downlink transmission power and the vertical axis indicates a range of increase in transmission power when the received TPC bit=1.

As shown in FIG. 3, when the received TPC bit is 0 (which means that the transmission power is to be reduced by 1 dB at the next TS) (NO in Step 21), the transmitter circuit 11 reduces the transmission power to a user by 1 dB (Step 22).

On the other hand, when the received TPC bit is 1 (which means that the transmission power is to be increased by 1 dB at the next TS) (YES in Step 21), the transmitter circuit 11 determines whether or not the value of the total downlink transmission power $P_{sum}$, which is notified from the transmission power limiting circuit 13, is less than or equal to a threshold value $P_{th}$ (Step 23). Incidentally, the threshold value $P_{th}$ is set to less than the specified maximum value of the total downlink transmission power. When $P_{sum} \leq P_{th}$ (YES in Step 23), the transmitter circuit 11 increases the transmission power to a user by 1 dB (Step 24). On the other hand, when $P_{sum} > P_{th}$ (NO in Step 23), the transmitter circuit 11 limits the increase in the downlink transmission power to a user to X dB (0<X<1) (Step 25).

Incidentally, the value of X may be determined by setting it as a fixed value satisfying 0<X<1, that is, a fixed value of {X|0<X<1|}, for example. As another example, the value of X may be determined by controlling the value of X so that the more the value of the total downlink transmission power $P_{sum}$ approximates to a maximum value of the total downlink transmission power $P_{dl\_max}$, the smaller the value of X becomes as depicted in FIG. 4 (decreasing function). Incidentally, the other decreasing function may be used to determine the value of X. That is, the value of X may be determined according to any decreasing function in which the value of the total downlink transmission power $P_{sum}$ that is normalized on the basis of the maximum value of total downlink transmission power $P_{dl\_max}$ falls in its domain and a value of X falls in its range.

As set forth hereinbefore, according to the transmission power controlling method and the base station apparatus of the present invention, the transmission power of the dedicated CHs is preferentially controlled. Therefore, it becomes possible to keep the total downlink transmission power of the base station within the specified maximum value of the total downlink transmission power while minimizing the adverse effects on the transmission power in the respective CPICH, PPCPCH and the like.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A transmission power controlling method for limiting a total downlink transmission power for transmission from a base station to subject user terminals to less than or equal to a specified maximum value of a total downlink transmission power in a mobile communication wireless network in which a plurality of wireless base stations execute an adaptive transmission-power control by setting transmit power control bits in a wireless line having multiple-access to user terminals, said method comprising:

when a value of the total downlink transmission power approximates to the maximum value, progressively restraining a base station apparatus from increasing a transmission power of a dedicated line to a user terminal relative to a transmission power that would have been required to be increased at a next time slot and in accordance with a restraint that becomes progressively larger as said specified maximum value is approached, wherein an increase in transmission power of a dedicated line to a user terminal, which is required to be increased at a next time slot, is restrained according to a given decreasing function in which a value of total downlink transmission power that is normalized on the basis of the maximum value of total dowulink transmission power falls in a domain thereof and a value of an increase in the transmission power of the dedicated line falls in a range thereof.

2. The transmission power controlling method as claimed in claim 1, wherein:

a threshold value that is less than the maximum value of total downlink transmission power is set to restrain an increase in transmission power of a dedicated line to a user terminal, which is required to be increased at a next time slot, when total downlink transmission power exceeds the threshold value; and an increase in transmission power of a dedicated line to a user terminal, which is required to be increased at a next time slot, is restrained according to a given decreasing function in which a value of total downlink transmission power that is normalized on the basis of the maximum value of total downlink transmission power falls in a domain thereof and a value of an increase in the transmission power of the dedicated line falls in a range thereof.

3. The transmission power controlling method as claimed in claim 1, wherein:

an increase in transmission power of a dedicated line to a user terminal, which is required to be increased at a next time slot, is restrained according to a given decreasing function in which a value of total downlink transmission power that is normalized on the basis of the maximum value of total downlink transmission power falls in a domain thereof and a value of an increase in the transmission power of the dedicated line falls in a range thereof; and the wireless network is based on the wideband-code division multiple access system.

4. The transmission power controlling method as claimed in claim 1, wherein:

a threshold value that is less than the maximum value of total downlink transmission power is set to restrain an increase in transmission power of a dedicated line to a user terminal, which is required to be increased at a next time slot, when total downlink transmission power exceeds the threshold value;

an increase in transmission power of a dedicated line to a user terminal, which is required to be increased at a next time slot, is restrained according to a given decreasing function in which a value of total downlink transmission power that is normalized on the basis of the maximum value of total downlink transmission power falls in a domain thereof and a value of an increase in the transmission power of the dedicated line falls in a range thereof; and the wireless network is based on the wideband-code division multiple access system.

5. A base station apparatus for a mobile communication wireless network, comprising:

a plurality of transmitter circuits for respective user terminals;

a plurality of transmitter circuits for common lines;

a transmission power limiting circuit; and a radio frequency circuit, wherein:

output signals from the transmitter circuits for respective user terminals and for common lines are added up to one output signal;

total downlink transmission power of the added-up output signal is cut at the transmission power limiting circuit so as to be less than or equal to a specified maximum value of total downlink transmission power;

the resultant signal is output to the radio frequency circuit;

a value of the total downlink transmission power is notified in each time slot from the transmission power limiting circuit to the respective transmitter circuits for respective user terminals; and a value of downlink transmission power is set at the respective transmitter circuits for respective user terminals in accordance with a received transmit power control bit and the notified value of the total downlink transmission power.

6. The base station apparatus as claimed in claim 5 wherein, when the value of the total downlink transmission power approximates to the maximum value, a transmitter circuit for a user terminal, which is requested to increase its transmission power at a next time slot by the received transmit power control bit, restrains an increase in the transmission power and sets a value of downlink transmission power.

7. A base station apparatus for a mobile communication wireless network, said base station comprising:

a plurality of transmitter circuits for respective user terminals;

a plurality of transmitter circuits for common lines;

a transmission power limiting circuit; and a radio frequency circuit, wherein:

output signals from the transmitter circuits for respective user terminals and for common lines are added up to one output signal;

total downlink transmission power of the added-up output signal is cut at the transmission power limiting circuit so as to be less than or equal to a specified maximum value of total downlink transmission power;

the resultant signal is output to the radio frequency circuit;

a value of the total downlink transmission power is notified in each of a time slot, from the transmission power limiting circuit to the respective transmitter circuits, for respective user terminals; and as said total downlink transmission power approaches said specified maximum value, on any requests for an increase on transmission power from one of said respective user terminals, a value of downlink transmission power is set at the respective transmitter circuits for respective user terminals in accordance with a restraint that becomes progressively larger as said specified maximum value is approached.

8. The base station apparatus of claim 7, wherein a threshold value that is less than the maximum value of total downlink transmission power is set, so that said restraint on increase in transmission power of a dedicated line to a user terminal is effective when total downlink transmission power exceeds the threshold value.

9. The base station apparatus of claim 7, wherein an increase in transmission power of a dedicated line to a user terminal, which is required to be increased at a next time slot, is restrained according to a given decreasing function in which a value of total downlink transmission power that is normalized on the basis of the maximum value of total downlink transmission power falls in a domain thereof and a value of an increase in the transmission power of the dedicated line falls in a range thereof.

10. The base station apparatus of claim 7, wherein the wireless network is based on the wideband-code division multiple access system.

11. The base station apparatus of claim 7, wherein a value of downlink transmission power is set at the respective transmitter circuits for respective user terminals in accordance with a received transmit power control bit and the notified value of the total downlink transmission power.

12. The base station apparatus of claim 11, wherein, when the value of the total downlink transmission power approximates to the maximum value, a transmitter circuit for a user terminal, which is requested to increase its transmission power at a next time slot by the received transmit power control bit, restrains an increase in the transmission power and sets a value of downlink transmission power.

* * * * *